United States Patent [19]
Vandenbrink et al.

[11] Patent Number: 4,826,289
[45] Date of Patent: May 2, 1989

[54] DAY/NIGHT REARVIEW MIRROR ASSEMBLY

[75] Inventors: Wayne Vandenbrink, West Olive; Howard W. Fant, Jr., Grand Haven, both of Mich.

[73] Assignee: Donnelly Corporation, Holland, Mich.

[21] Appl. No.: 92,450

[22] Filed: Sep. 3, 1987

[51] Int. Cl.⁴ .......................... B60R 1/04; G02B 17/00
[52] U.S. Cl. ...................................... 350/281; 350/280
[58] Field of Search ............... 350/280, 281, 276, 278, 350/634, 637

[56] References Cited

U.S. PATENT DOCUMENTS

| | | |
|---|---|---|
| 2,356,432 | 8/1944 | Roedding . |
| 2,469,207 | 5/1949 | Roedding . |
| 2,502,699 | 4/1950 | Budreck . |
| 2,640,394 | 6/1953 | Bertell et al. . |
| 2,691,919 | 10/1954 | Springer . |
| 2,722,159 | 11/1955 | Budreck . |
| 2,838,979 | 6/1958 | Meade . |
| 2,900,872 | 8/1959 | Mazur et al. . |
| 2,913,958 | 11/1959 | Mead et al. . |
| 2,964,999 | 12/1960 | Mazur ................................. 350/281 |
| 2,993,410 | 7/1961 | Bertell et al. . |
| 3,026,771 | 3/1962 | Knowlton et al. . |
| 3,029,701 | 4/1962 | Nelson . |
| 3,463,576 | 8/1969 | Church . |
| 3,472,580 | 10/1969 | Janosky . |
| 3,507,562 | 4/1970 | Yamashita et al. . |
| 3,522,987 | 8/1970 | Janosky et al. . |
| 3,525,564 | 8/1970 | Barton . |
| 3,586,422 | 6/1971 | Kagami et al. . |
| 3,870,404 | 3/1975 | Wilson et al. . |
| 3,918,799 | 11/1975 | Kurz, Jr. et al. . |
| 4,319,806 | 3/1982 | Brandenburg ...................... 350/281 |
| 4,436,371 | 3/1984 | Wood et al. . |
| 4,527,861 | 7/1985 | Van Duyn . |
| 4,679,906 | 7/1987 | Brandenburg ...................... 350/281 |

FOREIGN PATENT DOCUMENTS

| | | |
|---|---|---|
| 137412 | 5/1950 | Australia . |
| 1203145 | 10/1965 | Fed. Rep. of Germany . |
| 1237454 | 3/1967 | Fed. Rep. of Germany . |
| 2165226 | 7/1973 | Fed. Rep. of Germany . |
| 1780669 | 10/1973 | Fed. Rep. of Germany . |
| 2226481 | 12/1973 | Fed. Rep. of Germany . |
| 2406381 | 8/1975 | Fed. Rep. of Germany . |
| 1000125 | 3/1956 | France . |
| 1123827 | 9/1956 | France . |

(List continued on next page.)

OTHER PUBLICATIONS

Official Journal of the European Communities, Legislation, L 90, vol. 28, Mar. 29, 1985.

(List continued on next page.)

Primary Examiner—John K. Corbin
Assistant Examiner—Loha Ben
Attorney, Agent, or Firm—Price, Heneveld, Cooper, DeWitt & Litton

[57] ABSTRACT

A day/night rearview mirror assembly for vehicles useful in varying climatic conditions provides improved control and shifting between day and night positions, reduced undesired movement between day and night positions during adjustment of the major mirror position, and improved impact and bending resistance. The assembly preferably includes a molded mirror case, a prismatic mirror element and a two piece actuator assembly which provides consistent day/night shifting pressure in all temperatures. At least one stop member on the case back is included to limit actuator movement and precisely control day/night shifting. Cam surfaces on the actuator and stop member aid assembly. Downwardly opening support members pivotally mount the actuator assembly and prevent actuator movement toward the mirror element even upon impact. Ramp shoulders adjacent the support members also restrict actuator withdrawal. An extending lip on the actuator toggle limits movement of the separate actuator pivot member toward the mirror element upon impact and aids actuator installation. An improved actuator toggle having an integral retainer for a ball joint clamping member is also disclosed.

51 Claims, 6 Drawing Sheets

FOREIGN PATENT DOCUMENTS

| | | |
|---|---|---|
| 1295152 | 5/1962 | France . |
| 1562864 | 4/1969 | France . |
| 44139 | 8/1981 | Ireland . |
| 52-59431 | 5/1977 | Japan . |
| 750848 | 6/1956 | United Kingdom . |
| 1120517 | 7/1968 | United Kingdom . |
| 1188007 | 4/1970 | United Kingdom . |
| 1228742 | 4/1971 | United Kingdom . |
| 1227736 | 4/1971 | United Kingdom . |
| 1235466 | 6/1971 | United Kingdom . |
| 1274210 | 5/1972 | United Kingdom . |

OTHER PUBLICATIONS

Exhibit A—Photograph of Datsun 1975 280Z Rearview Mirror Used in the United States.
Exhibit B—Photograph of Datsun 1978 510 Rearview Mirror Used in the United States.
Exhibit C—Photograph of BMW Rearview Mirror.
Exhibit D—Photograph of Honda Rearview Mirror.
Exhibit E—Photograph of Another BMW Rearview Mirror.
Exhibit F—Photograph of Mercedes Rearview Mirror.
Exhibit G—Photograph of Metagal (Brazil) Rearview Mirror.
Exhibit H—Photograph of Another Metagal Rearview Mirror.
Exhibit I—Photograph of Siegel-Robert Rearview Mirror.
Exhibit J-Drawings of Toyota Motor Corporation Inner Rearview Mirror Assembly and Parts, Part No. 87816-002DL, 1983.

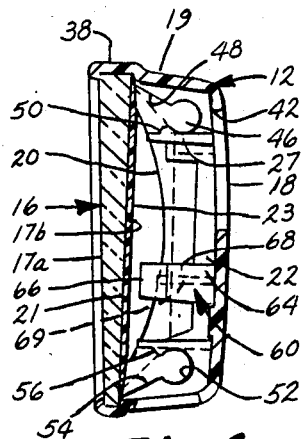
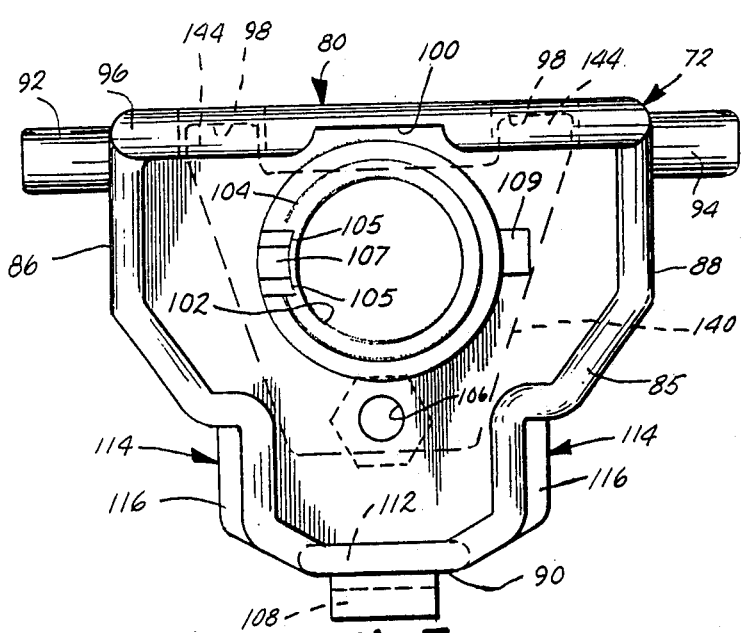
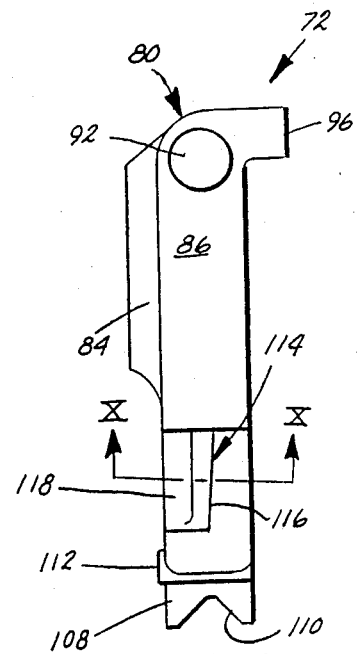
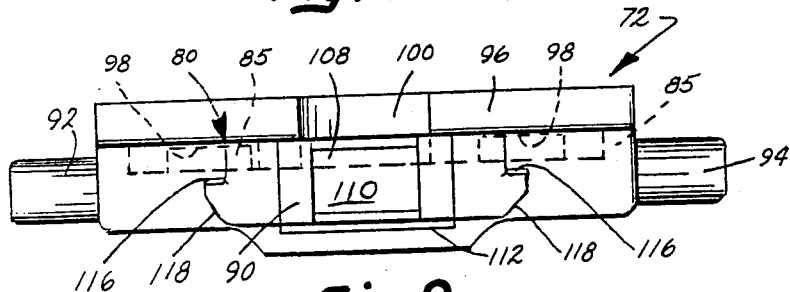
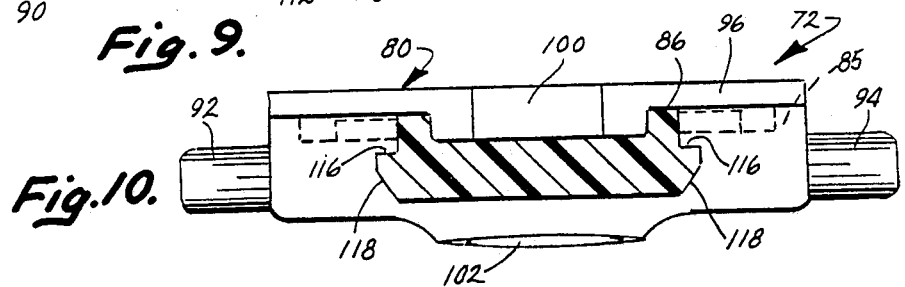

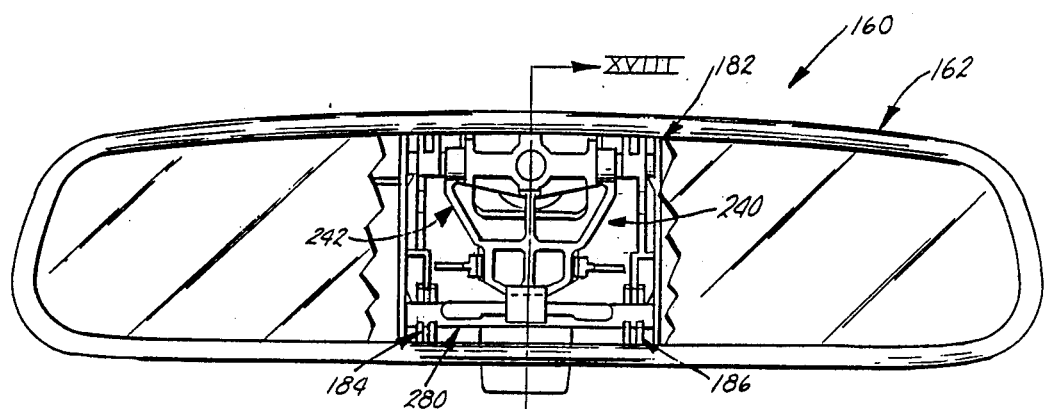
Fig. 17.
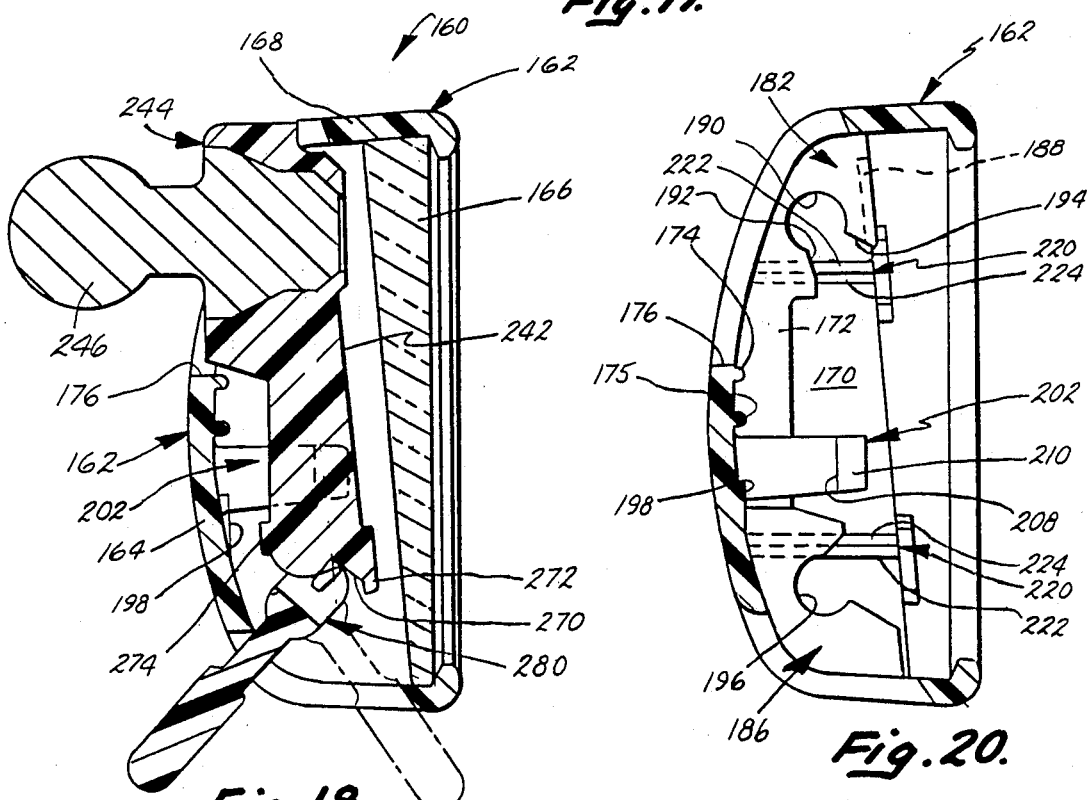
Fig. 18.
Fig. 20.
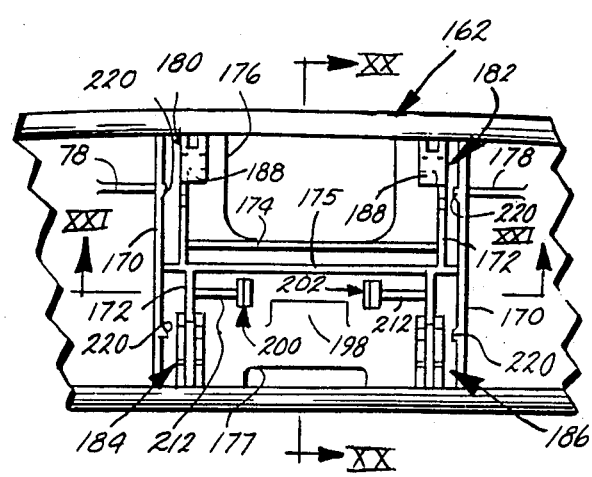
Fig. 19.

DAY/NIGHT REARVIEW MIRROR ASSEMBLY

BACKGROUND OF THE INVENTION

This invention relates to rearview mirrors for vehicles and, more particularly, to day/night rearview mirror assemblies which are shiftable between a high reflectivity day position and a reduced reflectivity night position whereby undesired, distracting glare from behind the vehicle visible to the driver in the rearview mirror is reduced and/or eliminated in the night position.

More specifically, the present invention relates to an improved day/night rearview mirror assembly in which shifting between the day and night positions is precisely controlled while annoying movement between the day and night positions during adjustment of the gross position of the mirror is reduced. Also, resistance to impact and bending is improved, and assembly weight and manufacturing costs are reduced while manufacturing assembly is facilitated.

Conventional day/night rearview mirrors employ a variety of systems to control movement between the high and low reflectivity positions. Such assemblies normally include a toggle member or other actuator to which is pivotally mounted the rearview mirror case and prism element. In many prior known structures, a cam or overcenter-type lever operator is used to pivot the case and prism with respect to the actuator. In turn, the actuator is normally mounted on a ball joint or other support extending to a fixed member in the vehicle.

A common method for controlling toggle/actuator movement in mirror cases is to limit their travel by contact with the rear side of the prism mirror element when mounted in the case. However, because of manufacturing tolerances and variations in assemblies, the final position of the mirror element is not precisely the same in each assembly. Moreover, the rear surface of the mirror element must be uniform. When the mirror elements are slightly mispositioned or the rear surface is irregular, pronounced inaccuracy in the day/night shifted positions of the assembly occurs because of the compound mispositioning of the assembled elements or irregular surfaces.

Other assemblies have used tabs extending laterally from the sides of the toggle actuator for engagement in apertures provided in reinforcing ribs or walls within the mirror case or with stops extending from the reinforcing ribs. However, the actuator must be forced into the openings in the ribs or past the stops on the ribs. To allow such insertion, the ribs are provided with sufficient flexibility which allows deflection/distortion to insert the toggle. In many instances, the deflected ribs, which are also relied upon to stiffen the entire case, do not return to their original position after assembly. Consequently, shifting movement cannot be precisely controlled. Also, the necessary flexibility of the ribs/walls allowing insertion often prevents adequate stability throughout the life of the assembly.

Another problem with prior known day/night rearview mirror assemblies is the undesired, annoying shift between day and night positions as the gross or major mirror position is adjusted to accommodate different sized drivers. As the entire mirror assembly is pivoted on its support, sufficient force is often generated to shift the assembly from day to night or night to day. Such occurrence is more pronounced in warmer climates where higher temperatures cause assembly expansion and reduce the shift resisting force present in the assembly. The problem also occurs more often when the mirror is positioned in the day position in which gross/major mirror adjustment is more often made.

A related problem to that of undesirable shift between day and night positions when adjusting the mirror in higher temperatures is that of inconsistent pressure or pivot force when moving the mirror assembly between its day and night positions. Thus, in higher temperatures, as the entire case expands, when less pressure is required to pivot prior known assemblies overcenter between day and night positions, a "mushy" feeling results when the pivot lever is moved because less than satisfactory holding force is maintained to keep the mirror assembly in one or the other of its positions.

Many prior known rearview mirror assemblies have also been unable to meet required standards for resistance to impact and bending set by various countries or organizations such as the European Economic Community (EEC). Consequently, in order to enable use of a rearview mirror assembly on a worldwide basis, it is necessary that a rearview mirror assembly meet or exceed requirements for both impact and bending such as those set by the EEC. For instance, the EEC standards provide that an assembly must resist breakage or scattering of broken glass when the mirror element is struck with a swinging pendulum having a rigid sphere weighing approximately 6.8 kilograms. The assembly must also support a weight or 25 kilograms on its lower edge when supported horizontally with its rear support extending downwardly without breaking.

Accompanying all of the above is continued emphasis from vehicle manufacturers on reducing cost and weight of mirror assemblies as a part of continued emphasis on improved vehicle efficiency and economy in today's marketplace.

The present invention was conceived in recognition of and as a solution for the above and other related problems.

SUMMARY OF THE INVENTION

Accordingly, the present invention provides a manually operated day/night rearview mirror assembly shiftable between a substantially full reflectivity day position and a reduced reflectivity night position to reduce unwanted glare from the mirror to the driver's eyes. The assembly provides improved control of the day and night positions for the assembly, reduces annoying shifting during gross mirror position adjustment, and provides reduced weight and manufacturing cost while manufacture of the assembly is facilitated and simplified.

In one form, the invention is a day/night rearview mirror assembly for vehicles comprising a mirror case, a prismatic mirror element having nonparallel, generally planar front and back surfaces supported and retained in the case and an actuator assembly mounted on the case for shifting the case and mirror element between a predetermined reflectivity day position and a reduced reflectivity night position. The actuator assembly includes lateral side edges and shafts and shaft supports for supporting the actuator assembly in the case. The case includes at least a pair of spaced ribs for reinforcement, the ribs extending generally transverse to the shafts. A pair of upstanding stop members on the case interior limit shifting movement of the actuator assembly toward the mirror element. One of said stop members is positioned between each lateral side edge of the actuator assembly and one of the ribs.

In other aspects of the invention, the upstanding stop members are spaced from but braced against the internal ribs within the case. Inclined upper surfaces on the stop members engage correspondingly sloped surfaces on the toggle actuator to provide a camming action facilitating insertion of the toggle in the molded case with minimal deflection. The stop members are spaced more closely together than the ribs or the support shafts for the actuator allowing the toggle actuator adjacent the stop members to be narrower in width thereby saving on material costs and weight.

In yet other aspects of the invention, the case is provided with spaced support members for receiving the shafts extending from the actuator assembly for moving the case between day and night positions. Support members adjacent the top of the case include shaft receiving spaces and flanges extending over the shaft receiving spaces to define access openings to the support spaces which open downwardly toward the bottom of the case and prevent the shaft means from moving toward the mirror element even upon severe impact such as during an accident. In addition, ramp members are provided on support walls adjacent the support members for resisting withdrawal of the shaft means from the shaft receiving spaces. Those ramp members may include inclined surfaces for deflection of the ramp members and supporting walls during assembly.

In yet another aspect, where the actuator assembly includes two separate parts, the upper toggle member may include a downwardly extending lip adjacent the pivot surface which engages the lower pivot member of the assembly. The lip extends over a spring bar on the pivot member between the spring bar and the mirror element to help prevent movement of the pivot member toward the mirror element and to aid in assembling the mirror assembly.

In another form of the invention the stop members are positioned to require longer movement distance to move the assembly from its day position to the night position than is required to move the case out of its night position. Preferably, 60% of the overcenter actuator pivot lever travel is required to move the assembly out of its day position. This prevents undesired day/night shifting of the assembly when the gross position of the mirror assembly is adjusted by a driver on its support.

In yet other aspects, a toggle actuator may include an improved reinforcement structure including a ball joint clamping plate cooperating with a molded polymeric reinforcing rib on the actuator to reduce the number of overall parts as well as actuator assembly weight and manufacturing cost.

Accordingly, the present invention provides the advantages of precise control of the day/night viewing positions and shift angles via stop surfaces which are independently positioned from other structures within the one component case for proper control and function. The stop surfaces are preferably included on the molded case such that they may be controlled in one mold for accuracy. No dependence on assembled parts such as the independently positioned mirror prism is required. The position of the prism can vary from case to case and cause compounded inaccuracies after assembly. Hence, control of the day/night position is self-contained within the mirror case.

In addition, the stop members are strong and stable yet allow easy installation of the actuator assembly with minimum deflection through the use of cooperating camming surfaces.

The assembly may also avoid annoying flip or shifting between day and night viewing positions when the gross mirror position is adjusted by requiring greater movement of the pivot lever to move the assembly out of its day position than when the assembly is moved from its night position. Since the majority of mirror position adjustment for different driver sizes is done with the mirror in its day viewing position, undesired shifting is significantly reduced.

In addition, the invention provides improved resistance to impact breakage such as during accidents and to bending caused by such impact. The pivot supports for the actuator assembly within the case are closed toward the mirror element and open downwardly toward the case bottom. Hence, movement of the actuator even if forced in the direction of the mirror element is prevented thereby reducing disassembly, fracture or breakage of the mirror glass and consequent injury to occupants within a vehicle. Further, withdrawal of the actuator support shafts from the support members within the case is further restricted by the ramp members.

Also, installation of the actuator assembly and resistance to movement of the lower actuator member toward the mirror glass is also provided by an extending lip on the upper toggle member. Shifting pressure for moving the mirror assembly between day and night positions is consistent and satisfying even in extremely hot or cold temperatures because of the improved two piece toggle/actuator assembly providing better control over the pivot force. In addition, the improved actuator assembly and case of the present invention have reduced weight, manufacturing cost and simplified assembly.

These and other objects, advantages, purposes and features of the invention will become more apparent from a study of the following description taken in conjunction with the drawings.

BRIEF DESCRIPTION OF THE DRAWINGS

FIG. 6 is a sectional view of the mirror case with mirror prism element installed but omitting the actuator assembly and taken along plane VI—VI of FIG. 3;

FIG. 7 is a front elevation of the actuator toggle member of the mirror assembly of FIG. 1;

FIG. 8 is a left side elevation of the toggle member of FIG. 7;

FIG. 9 is a bottom plan view of the toggle member of FIGS. 7 and 8;

FIG. 10 is a sectional view of the toggle member taken along plane X—X of FIG. 8;

FIG. 17 is a front elevation of a second embodiment of the day/night rearview mirror assembly of the present invention showing the prismatic mirror element broken away and the actuator assembly mounted therein;

FIG. 18 is a sectional side elevation of the mirror assembly taken along plane XVIII—XVIII of FIG. 17;

FIG. 19 is a fragmentary front elevation of the molded, one piece mirror case of the assembly shown in FIGS. 17 and 18 with the toggle actuator assembly removed;

FIG. 20 is a sectional side elevation of the mirror case in FIG. 19 taken along plane XX—XX of FIG. 19;

DESCRIPTION OF THE PREFERRED EMBODIMENTS

Figure 1:
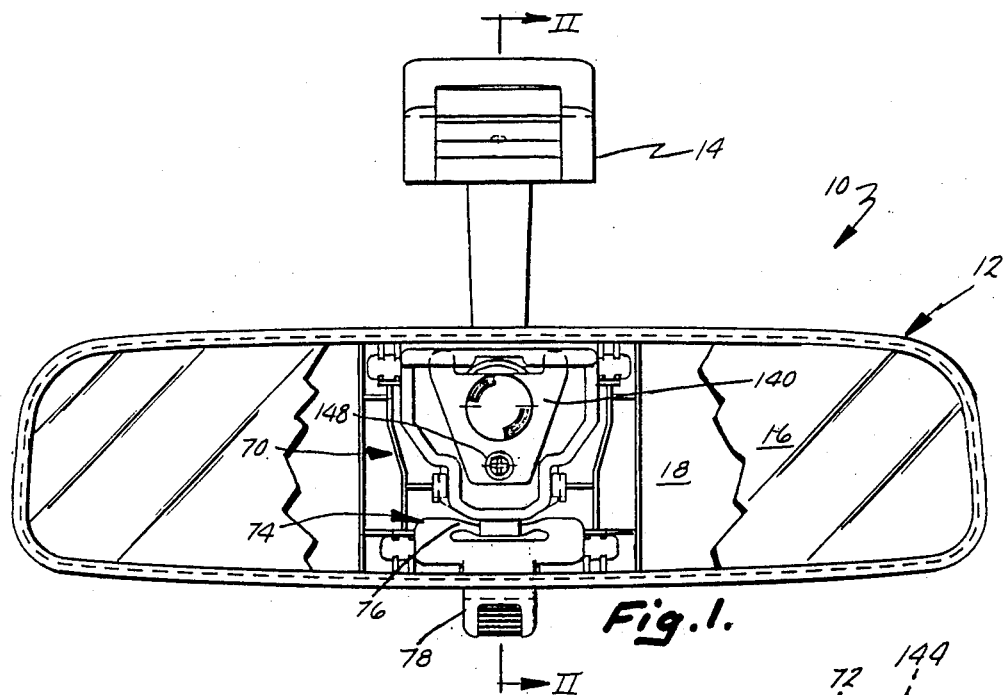
FIG. 1 is a front elevation of a first embodiment of the day/night rearview mirror assembly of the present invention.
Figure 4:
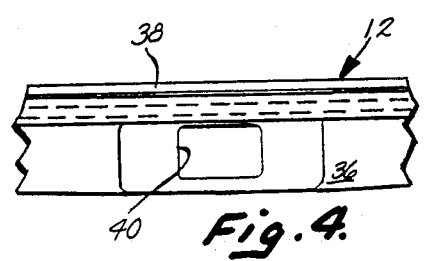
FIG. 4 is a fragmentary, bottom plan view of the mirror case portion shown in FIG. 3.
Figure 2:
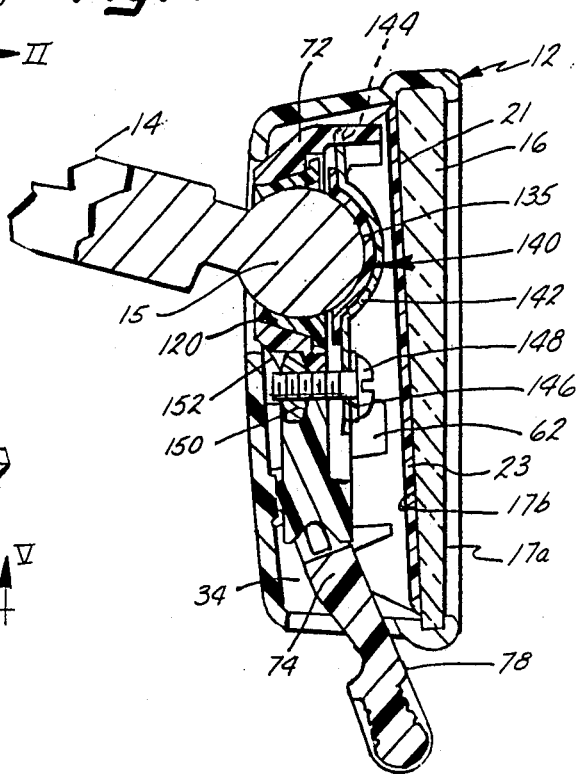
FIG. 2 is a sectional side elevation of the complete mirror assembly taken along plane II—II of FIG. 1.

Referring now to the drawings in greater detail, FIGS. 1-16 illustrate a first embodiment 10, of the day/night rearview mirror assembly. As is best seen in FIGS. 1 and 2, mirror assembly 10 generally includes a molded, thermoplastic mirror case 12 having a length greater than its width. A two-part overcenter-type toggle actuator assembly 70 is pivotally mounted in the center section of case 12. Actuator assembly 70 is adapted to receive some type of pivotal mounting from a fixed vehicle support such as breakaway support arm 14 having ball member 15 at its end. Breakaway support arm 14 may be of various types and forms no part of the present invention. The upper part of the two-part actuator assembly 70 includes a reinforced toggle member 72 pivotally received in spaced pivot supports 26, 28 molded integrally within case 12 and a separate, molded pivot lever or member 74. Pivot lever 74 has an integral spring bar 76 resiliently engaging the bottom of toggle member 72 and is pivotally supported in a separate set of spaced pivot supports 32, 34 in the lower, center portion of mirror case 12. Actuator assembly 70 is received within the interior of case 12 between rear wall 18 and the rear side of a prismatic reflective mirror element 16. Pivotal movement of the extending tab 78 of pivot lever 74 generally in a direction perpendicular to the general plane of mirror element 16 causes overcenter action of the two-part actuator assembly 70 and shifting of mirror case 12 and, thus, the position of the reflective mirror element 16, for day and night viewing positions as explained more fully hereinafter.

As is seen in FIGS. 3-6, molded case 12 is generally of a hollow construction having a shell of thermoplastic material, such as polypropylene, a back wall 18 spaced behind mirror element 16, a continuous peripheral sidewall 19, integral, upstanding mirror case support walls or ribs 20, integral, upstanding support ribs 22 and structural cross members or braces 24 extending between walls 20 and ribs 22. Walls or ribs 20 are higher than ribs 22 (FIG. 6). Spaced upper pivot shaft supports 26, 28 are molded integrally with the case between top wall 30 and case back 18 and are reinforced by ribs 22 which connect them in a direction transverse to the longitudinal direction of case 12 and the pivot shafts on actuator assembly 70. Lower shaft pivot supports 32, 34 extend between back wall 18 and bottom wall 36 and are likewise reinforced by ribs 22. A molded mirror element retaining rim 38 extends around the forward edge of continuous peripheral wall 19 on case 12 and defines an opening to the hollow interior of the case. That opening normally is positioned to face rearwardly within the vehicle when mounted on support 14 as shown in FIGS. 1 and 2.

Figure 3:
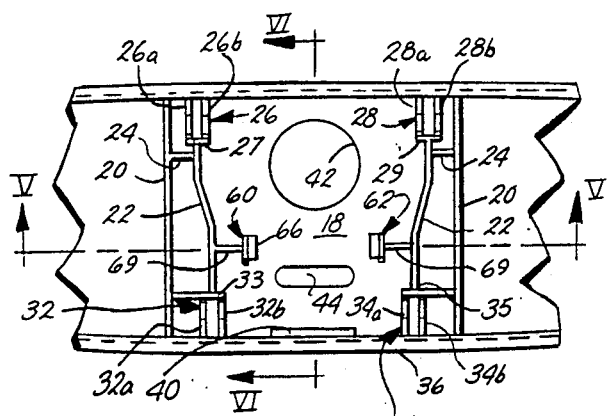
FIG. 3 is a fragmentary front elevation of the molded, one piece mirror case of the assembly shown in FIG. 1 with the actuator assembly removed.

Bottom wall 36 of case 12 includes a generally rectangular opening 40 which provides space through which the pivot tab 78 of pivot lever 74 extends when actuator assembly 70 is mounted within the case. Similarly, a circular aperture 42 is provided through the upper portion of the center part of back wall 18 through which the support arm 14 and ball member 15 are received (FIGS. 2 and 3). In addition, an elongated raised area 44 extends inwardly from the inside surface of back wall 18 to provide a contact surface for the actuator assembly to help control its pivotal movement and position the toggle member 72 in its night position as will be explained hereinafter.

Mirror element 16 is preferably a transparent, prismatic element of glass, plastic or the like having nonparallel front and back surfaces 17a, 17b, respectively (FIGS. 2 and 6). The rear surface 17b has a thin layer 21 of reflective material such as metallic silver, chrome or the like preferably covered by a resilient, impressionable, protective, anti-scattering layer 23 of a resinous material such as polyvinyl chloride (PVC) applied in plastisol form followed by heat curing.

As seen in FIGS. 1, 3, 5 and 6, upper and lower pivot shaft support members 26, 28 and 32, 34 are molded integrally with case 12 on the inside surface of case back 18 between support walls 20. Upper shaft support members 26, 28 are spaced laterally from and aligned with one another on case back 18. Each support member 26, 28 includes a pair of parallel support ribs or walls 26a, 26b and 28a, 28b respectively. These support ribs are identical and include a circular shaft receiving space 46 (FIG. 6) which opens toward the front of the mirror case and toward prismatic mirror element 16. A slanted surface 48 is included on each support wall to direct the actuator support shafts into the shaft receiving spaces 46 when the actuator is installed and pressed into the supports. Support walls 26a, 26b, 28a, 28b are respectively connected by transverse ribs 27, 29 (FIG. 3) each of which includes a retaining lip 50 allowing the actuator support shafts to be snapped into and retained in receiving spaces 46.

Similarly, the lower shaft supports 32, 34 each include parallel support walls 32a, 32b, 34a, 34b which include shaft receiving spaces 52 which are parallel and aligned with one another across the case. Support walls 32a, 32b, 34a, 34b are respectively joined by transverse ribs 33, 35. The transverse ribs include angled lead-in surfaces 54 directing the shafts into the receiving spaces 52, and lips 56 which retain the shafts in position in like manner to lips 50.

Supports 26, 28 and 32, 34 are interconnected by upstanding support ribs 22 which are integral with the inside surface of the case back 18 (FIGS. 3 and 6). These ribs, along with support walls 20, rigidify the central, actuator support area of the case and hold the support members at their precise spacing to allow proper actuator pivot control over the mirror position. As will be seen in FIG. 3, however, supports 32, 34 are spaced slightly closer together than upper supports 26, 28 due to the tapered design of the actuator shown in FIGS. 1 and 7–12.

Figure 5:
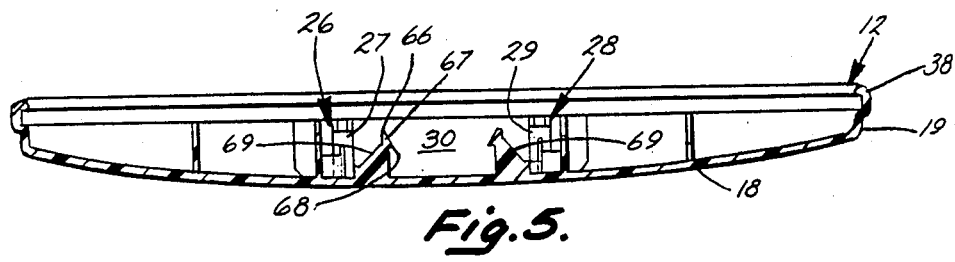
FIG. 5 is a sectional view of the mirror case taken along plane V—V of FIG. 3.

With reference to FIGS. 3, 5 and 6, the actuator support area of the interior of case 12 also includes a pair of laterally spaced upstanding stop members 60, 62 which extend outwardly toward mirror element 16 from the inside surface of case back 18. Stop members 60, 62 are mirror images of one another and each include an outwardly extending wall 64 having a laterally inwardly extending flange 66 at its outer end. The outer surface of flange 66 is angled downwardly and inwardly to provide a camming or deflecting surface which cooperates with a surface on the underside of actuator toggle member 72 when pressed into the case during assembly. The underside of flange 66 includes a stop surface 68 which is substantially parallel to case back 18 and cooperates with a stop shoulder on the actuator toggle member to limit pivotal movement of toggle 72 toward mirror element 16. Stop surfaces 68 are inclined slightly downwardly and toward the lower corner of case 12 between case back 18 and bottom wall 36 to match the angle of the stop shoulders on the actuator toggle member. In addition, each stop member includes a downwardly inclined brace 69 extending between upstanding walls 64 and rib 22 to provide lateral rigidity for the stop members to insure proper positioning and control of the actuator assembly. Braces 69 extend to a position slightly below the top of stop members 60, 62 which allows the top portion of the stop members to be deflected slightly or cammed outwardly more easily during insertion of the actuator toggle member.

Referring now to FIGS. 7–10, actuator toggle member 72 includes a body 80 preferably molded from polypropylene or acetal resin including front and back surfaces 82, 84 and an upstanding ridge 85 which outlines the edge of body 80 and defines lateral side edges 86, 88 and bottom edge 90. Edges 86, 88 are spaced to fit between and immediately adjacent support members 26, 28 to prevent lateral movement of toggle 72 in case 12. Adjacent the top edge of body 80 a pair of cylindrical support shafts 92, 94 extend laterally outwardly perpendicular to side edges 86, 88 and are concentric and parallel with one another and to bottom edge 90. A reinforcing ridge 96 extends parallel to the axis of cylindrical shafts 92 94 and includes a pair of laterally spaced recesses 98 formed therein and opening downwardly toward bottom edge 90. A recess 100 centered in the lower portion of ridge 96 provides space for circular ball member receiving aperture 102 and surrounding recess 104 formed in the center portion of actuator toggle body 80. Slightly below ball member receiving aperture 102 is a second aperture 106 adapted to receive a retaining bolt and nut for applying clamping friction pressure to a clamping plate as explained hereinafter. Formed integrally with the bottom wall 90 is a downwardly extending flange 108 having a downwardly opening, V-shaped pivot surface 110 adapted to engage the spring bar of lower, separate pivot member 74. An elongated contact surface 112 (FIGS. 7–9), adapted to contact pad or surface 44 on the interior of the case back 18 to precisely position the actuator toggle body in its night position, is also included.

As is shown in FIGS. 7–9, the lower portion of toggle body 80 narrows to provide a pair of recessed stop shoulders 114 spaced inwardly from lateral side edges 86, 88 and support shafts 92, 94. Each stop shoulder 114 extends generally parallel to lateral side edges 86, 88 and perpendicular to the axis of shafts 92, 94 and includes a stop surface 116 which is positioned between front and back surfaces 82, 84 and slightly downwardly inclined to match the inclined stop surface 68 on the underside of flanges 66 on stop members 60, 62. Inclined lower surfaces 118 angle downwardly and inwardly toward one another to mate with cam surfaces 67 on stop members 60, 62 to deflect those surfaces outwardly during installation of the toggle body member in the case 12.

Figure 11:
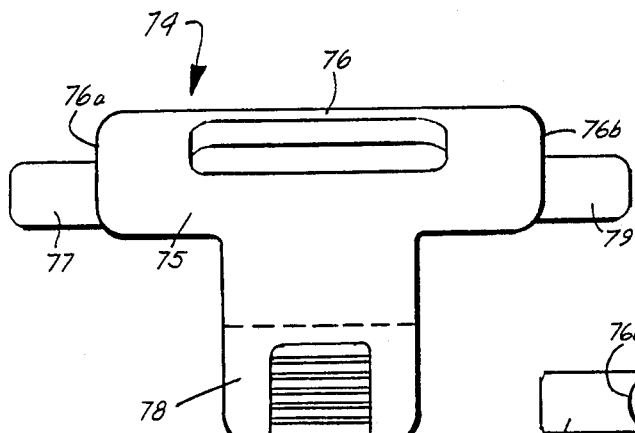
FIG. 11 is a front elevation of the actuator pivot lever of the mirror assembly of FIG. 1.
Figure 12:
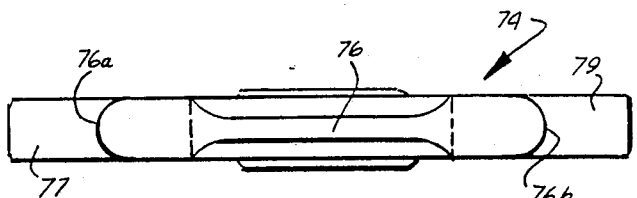
FIG. 12 is a top plan view of the pivot lever of FIG. 11.
Figure 15:
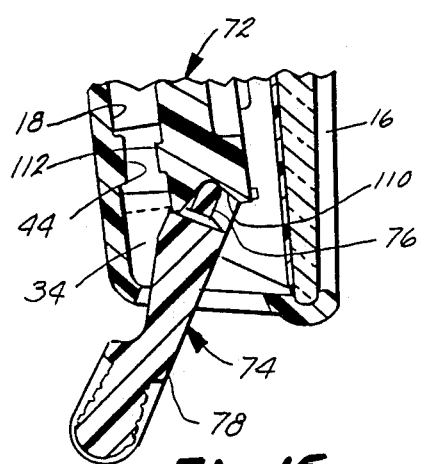
FIG. 15 is a fragmentary, enlarged side sectional view of the lower portion of the assembly of FIG. 2 showing the mirror assembly in day viewing position.

Referring now to FIGS. 11 and 12, lower actuator pivot lever or pivot member 74 includes a pivot body 75, spring bar 76 which is raised or spaced above the main body 75, and a downwardly extending tab lever 78 for manual actuation of the actuator assembly 70 within case 12. A pair of parallel, cylindrical pivot support shafts 77, 79 extend outwardly from either side of body 75 and are adapted to fit in support shaft receiving spaces 52 of lower support members 32, 34. Spring bar 76 has a rounded upper surface adapted to mate with V-shaped surface 110 on the bottom of toggle member 72. Ends 76a, 76b of bar 76 are spaced to fit between and against the inside edges of transverse ribs 33, 35 and support members 32, 34 to prevent lateral movement of lever 74 in the case. Ends 76a, 76b are also rounded for easier insertion. The side surfaces of spring bar 76 may be tapered inwardly toward one another to provide greater clearance with V-shaped surface 110 when pivot member 74 is pivoted to its day position as shown in FIG. 15.

Figure 13:
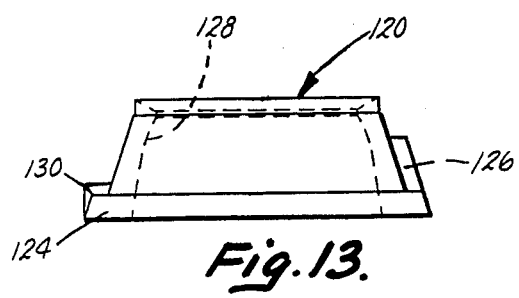
FIG. 13 is a side elevation of the ball stay cup of the mirror assembly of FIG. 1.
Figure 14:
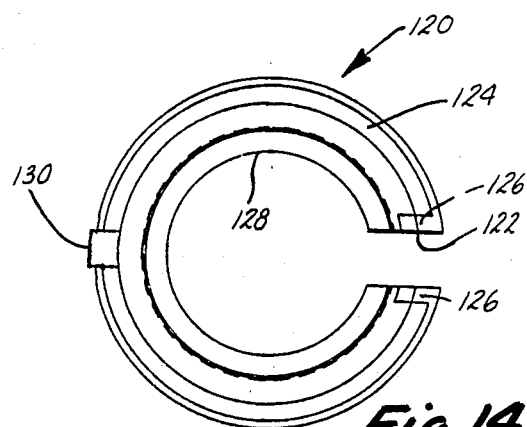
FIG. 14 is a top plan view of the ball stay cup of FIG. 13.

As shown in FIGS. 13 and 14, mirror assembly 10 also includes a generally frusto conical ball, split ring stay cup 120 also preferably molded from polypropylene or acetal resin. Cup 120 includes a relieved area or opening 122, an annular ridge 124, and locating flanges 126 and 130. A ball member receiving opening 128 extends through the cup. Locating flange 130 is spaced opposite opening 122. Locating flanges 126 are adapted to be received in openings 105 formed on either side of locating member 107 molded in the recess 104 on actuator body member 80, while locating flange 130 is adapted to be received in recess 109 molded within recess 104.

As shown in FIGS. 1 and 2, assembly of rearview mirror 10 will now be apparent. Ball member 15 on support arm 14 is passed through opening 42 in back 18 of case 12 and for assembly with actuator toggle member 72. Ball stay cup 120 is expanded slightly over the ball member after the ball member has been passed through opening 102 in toggle body member 80. Cup 120 is then located in recess 104 with locating flanges 126 and 130 received in recesses 105, 109. A molded polypropylene or acetal resin ball cap 135 is then placed over the exposed end of ball member 15 followed by placing a metallic clamping plate 140 (FIGS. 1, 2 and 7) over-top ball cap 135. Clamping plate 140 is generally triangular in shape and includes a central depression 142, a pair of laterally spaced upwardly extending ears 144 which are received in recesses 98 in ridge 96 when depression 142, is received over ball cap 135, and a lower fastener receiving aperture 146 (FIG. 2). Aperture 146 is aligned with opening 106 in actuator body 80 when depression 142 is received over ball cap 135.

After assembly of ball cap 135 and clamping plate 140, a retaining screw 148 is passed through apertures 146 and 106 and is threaded through retaining nut 150 received in a hexagonal recess 152 on the rear side of actuator body 80. By tightening screw 148, friction pressure of ball cap 135 is increased on ball 15 against cup 120 to hold assembly 10 in its proper adjusted position on arm 14. Clamp plate 140 acts as a lever pivoting about ears 144 in recesses 98.

Next, actuator assembly 70 is inserted in the center interior portion of case 12 by aligning shafts 92, 94 on actuator body 80 with support members 26 28 while pivot member 74 is nested with spring bar 76 within V-shaped pivot surface 110 and support shafts 77, 79 aligned with support members 32, 34. Actuator toggle 72 and pivot member 74 are then pressed inwardly such that shafts 92, 94 and 77, 79 are snapped into shaft receiving spaces 46, 52 via camming surfaces 48, 54 and past lips 50, 56 for proper pivotal retention in the mirror case. During such movement, surfaces 118 on toggle 72 deflect stop members 60, 62 slightly outwardly via surfaces 67 to allow passage of toggle body 80 into place. Pivot member 74 may then be grasped by tab lever 78 and rotated forwardly and rearwardly for overcenter-type pivot action with toggle 72 to provide day and night positions for the actuator assembly 70 within case 12.

As shown in FIG. 15, when tab lever 78 is pivoted rearwardly, actuator toggle 72 is pivoted forwardly and the rear reflective surface 17a, 21 of mirror element 16 is aligned with the driver's eyes for full reflectivity use in the day position. When tab lever 78 is pivoted forwardly as shown in FIG. 2, actuator toggle 72 is pivoted rearwardly and case 12 and mirror element 16 are pivoted about ball member 15 such that the front, non-silvered surface 17a of glass mirror element 16 is aligned with the driver's eyes for reduced reflectivity or night driving. In the day position, the actuator toggle location is defined by contact between stop surfaces 68 and 116 while in the night position the position is defined by contact between surfaces 44 and 112. Since the distance between surface 44 and the overhanging undersurface 68 of stop members 60, 62 is wholly defined within case 12 and is not dependent upon the assembly of any other part within the case, the travel of actuator body 72 between those surfaces is precisely controlled such that the position of the surfaces on mirror element 16 is precisely controlled for proper viewing. The integral resiliency of spaced spring bar 76 flexes as the toggle is moved between day and night positions in overcenter fashion since the combined length of toggle 72 and lever 74 at the vertical or centered position is greater than the distance between support spaces 46, 52 and because the toggle body member 80 is rigid and does not flex. The give in the spring bar 76 and the rigidity and strength of the center area of the case prevent any substantial flexing of the case 12 providing further positioning accuracy for the assembly.

Figure 16:
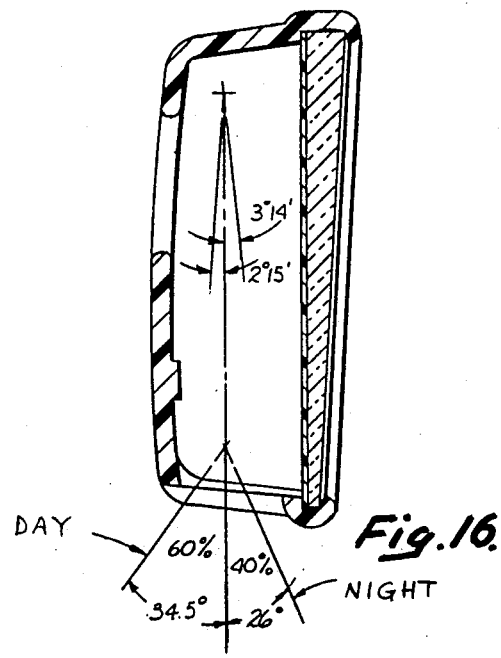
FIG. 16 is a side sectional view of the mirror assembly schematically illustrating the angular travel distances for the actuator toggle and pivot member.

With reference to FIG. 2, it will be understood that the major adjustment position of the mirror assembly 10 is controlled by positioning the mirror assembly on ball member 15 by the driver. In order to prevent overcenter pivoting of actuator assembly 70 between day and night positions when the major mirror position of assembly 10 is changed by a driver on ball member 15, the locations of stop surfaces 44, 68 are positioned as shown in FIG. 16 to provide 60% of the travel from the rear or day position of tab lever 78 to the overcenter or centered position and 40% of the travel from the night position of tab lever 78 to the overcenter or centered position. For example, this corresponds to 3 degrees 14 minutes of angular movement of the case and mirror element about pivot shafts 92, 94 in the day position and 2 degrees 15 minutes of angular travel in the night position. Likewise, tab lever 78 moves through 34.5 degrees of travel from the day position to the centered position and only 26 degrees of angular travel from the night position to the centered position. The greater amount of travel required for the pivot member to the centered or overcenter position from the day position prevents the assembly from moving from day to night position when the gross or major position of the mirror assembly is changed by the driver about ball member 15. Thus, even if screw 148 is adjusted to provide tight clamping pressure on ball member 15, rotation of the case assembly on ball member 15 by grasping the upper and lower edges of case 12 with the tab lever in the day position will avoid changing of the pivot member to the night position even if the toggle member pivots slightly on shafts 92, 94 during such rotating movement. This is because the friction pressure on ball member 15 is slightly greater than the force of spring bar 76 against pivot surface 110.

It is also possible to provide the pivot member with 50% of its travel from the center position toward both the day and night positions if desired. Also, other ratios of day to night travel can also be used.

Referring now to FIGS. 17–29, a second embodiment 160 of the day/night rearview mirror assembly is illustrated. Like embodiment 10, assembly 160 includes a thermoplastic mirror case 162 preferably molded from polypropylene and having a length greater than its width. A two-part, overcenter-type toggle actuator assembly 240 is pivotally mounted in the center section of case 162 including an actuator toggle member 242 and a separate pivot lever or member 280. Unlike toggle assembly 70, however, actuator toggle member 242 includes an internal, cast metal reinforcing member 244 having an integral ball member 246 extending outwardly therefrom which is adapted to be received in a mirror support arm of conventional variety to allow adjustment of the overall mirror assembly position.

As is best seen in FIGS. 17–22, molded case 162 is generally of hollow construction having a back wall 164 spaced behind the prismatic mirror element 166 which is substantially similar to element 16. Case 162 also includes a continuous, peripheral sidewall 168 having top, bottom and end portions. Within the case interior are included integral, upstanding mirror case support walls or ribs 170 extending transversely across the interior of the case generally perpendicular to the direction of longitudinal extension of the case. Integral ribs 172 extend generally parallel to walls 170 but are of lesser height. Longitudinal bracing ribs 174, 175 extend between ribs 170 and 172. Ribs 174, 175 strengthen the case back in the area of rear opening 176 through which ball member 246 passes from actuator toggle member 242. Opening 177 extends through the case back 164 and bottom peripheral sidewall 168 at the lower corner of the case to allow passage of the pivot member 280 when installed within the case as shown in FIG. 18. Support walls 170 are reinforced on their outer sides by gussets 178 (FIG. 19) molded integrally between the case back and support walls in the area adjacent the pivot supports for the actuator assembly.

In the area between support walls/ribs 170 are laterally spaced upper pivot shaft supports 180, 182 and lower pivot shaft supports 184, 186. Each upper and lower pair of pivot supports 180, 184 and 182, 186 is interconnected by one of the integral bracing ribs 172 to maintain the supports at their proper spacing. Upper pivot shaft supports 180, 182 differ from supports 26, 28 in embodiment 10 by each including a cover or front flange 188 extending over the support walls forming the support member in the area between the support member and prismatic mirror element 166. Flange 188 covers the shaft receiving space 190 and prevents the shafts from the actuator assembly from moving forwardly toward the mirror element upon impact. Supports 180, 182 do, however, open generally downwardly toward the bottom wall of the case 162 such that the actuator pivot shafts may be inserted from that direction under flange 188. Inclined or angled surfaces 192, 194 leading to shaft receiving space 190 are provided on support members 180, 182 to guide the shaft members into place during assembly.

Lower pivot shaft support members 184, 186 are laterally spaced and aligned with one another and include a pair of parallel support walls defining a pivot shaft receiving space 196 opening at an angle toward the prismatic mirror element in a manner similar to supports 32, 34 in embodiment 10. A raised contact surface or pad 198 on the inner surface of case back 164 is provided to contact and position the actuator toggle member in its night position as explained more fully below.

Figure 21:
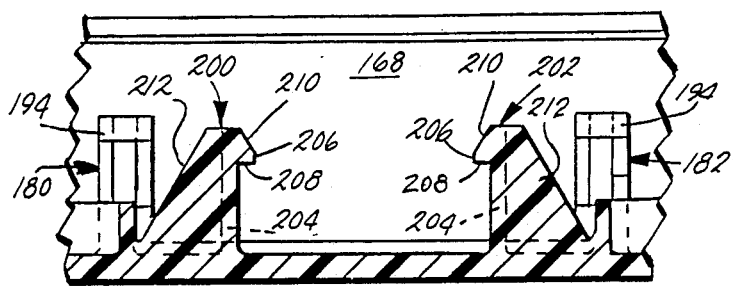
FIG. 21 is a fragmentary sectional view of the mirror case of FIGS. 17-20 taken along plane XXI—XXI of FIG. 19.
Figure 22:
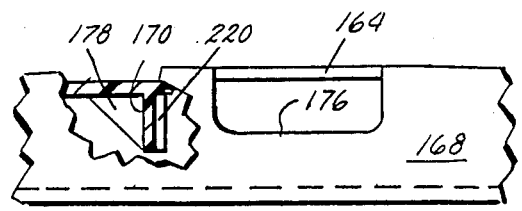
FIG. 22 is a fragmentary top view of the mirror case portion shown in FIGS. 19 and 21 with portions broken away.
Figure 26:
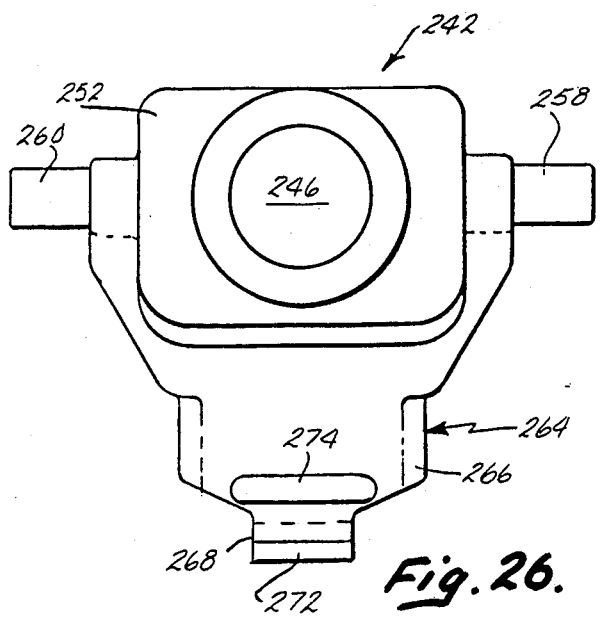
FIG. 26 is a back elevation of the actuator toggle member of FIGS. 23-25.
Figure 25:
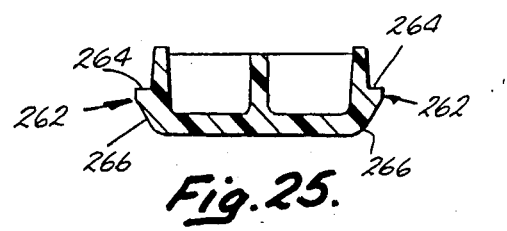
FIG. 25 is a sectional view of the toggle member of FIGS. 23 and 24 taken along plane XXV—XXV of FIG. 23.

As shown in FIGS. 17-21, the interior of the case in the center area also includes a pair of upstanding stop members 200, 202 extending outwardly toward the prismatic mirror element from the interior of the case back. Each stop member is generally similar to stop members 60, 62 in embodiment 10 and includes an upstanding wall 204, a laterally extending flange 206 including an overhanging stop surface 208 and an upper cam or deflecting surface 210. Unlike stop members 60, 62, however, stop members 200, 202 are reinforced by gussets or triangular braces 212 which extend from the case back adjacent the inner surface of ribs 172 to the top of support wall 204 at the outer end of stop members 200, 202 as best seen in FIG. 21. Stop surfaces 208 are angled downwardly toward the bottom peripheral wall of the case to match the angle of the stop surfaces on actuator toggle member 242 as described below.

In combination with the support members 180, 182 and 184, 186, the inside surfaces of support walls 170 each include inclined ramp members or shoulders 220 (FIGS. 19 and 20) which extend outwardly from adjacent the back wall of the case to the outer edge of walls/ribs 170. Ramp members 220 include planar stop surfaces 222 facing the shaft receiving spaces 190, 196, respectively, and an inclined or angled camming surface 224 facing one another to facilitate insertion of the pivot shafts from the actuator and pivot lever/member during assembly. As explained below, once the pivot shafts are slid past the ramp members 220, stop surfaces 222 adjacent support members 180, 182 resist removal of the shaft members in combination with outer flanges 188 from the upper support members even upon severe impact. Likewise, ramps 220 adjacent the lower support members 184, 186 resist movement of the shafts out of the shaft receiving spaces 196. Camming surfaces 224 allow the support walls 170 to flex slightly outwardly to allow passage of the shaft ends as explained below.

Figure 23:
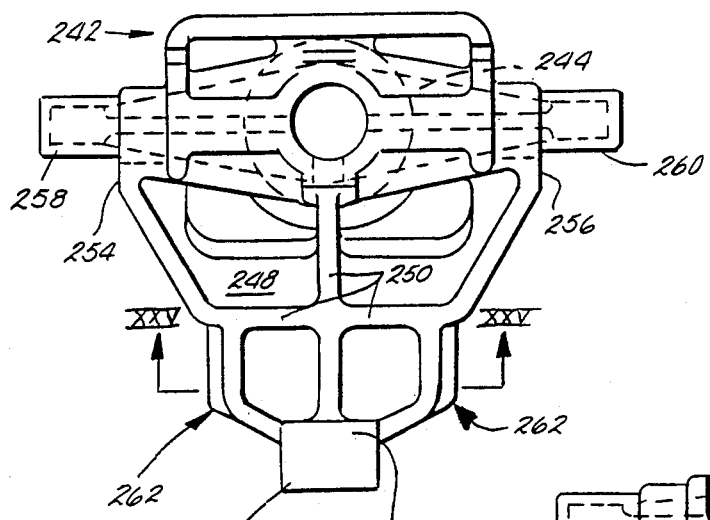
FIG. 23 is a front elevation of the actuator toggle member of the mirror assembly of FIG. 17.
Figure 24:
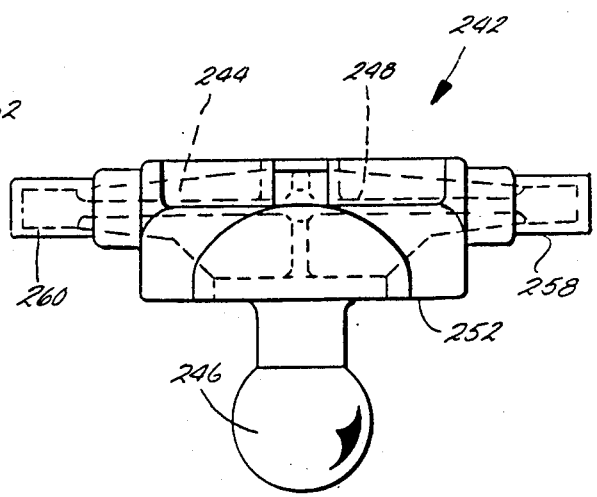
FIG. 24 is a top plan view of the toggle member of FIG. 23.

As shown in FIGS. 18 and 23-26, actuator toggle member 242 includes an actuator body 244 molded from acetal resin or the like about a reinforcing core 244 of cast metal having ball member 246 extending rearwardly therefrom. The front surface of actuator toggle body 248 is a series of indentations outlined by molded ribs 250 which rigidify the actuator body but eliminate excess material for reduced weight. The rear surface of body 248 includes a molded surface protrusion 252 which matches the contour and shape of opening 17 to substantially fill that opening and provide the impression of a continuous case back when the actuator is mounted within case 162. Extending from opposing lateral side edges 254, 256 are aligned, parallel cylindrical pivot shafts 258, 260 which are molded around cylindrical extensions on the ends of cast metal reinforcing member 244 as shown in FIGS. 23 and 24.

Actuator 242 tapers inwardly to a narrow lower portion including stop shoulders 262, 264 on either lateral edge thereof. Stop shoulders 262, 264 are generally similar to shoulders 114 on toggle member 72 and each include an upwardly facing stop surface 264 which is inclined slightly downwardly to match the stop surface 208 on the underside of flange 206 of stop members 200, 202 as explained above. The undersurface of each stop shoulder 262 includes an inclined cam or deflecting surface 266 adapted to engage surfaces 210 of stop members 200, 202 to deflect them slightly outwardly when actuator toggle member 242 is pressed into the case upon assembly. Projecting downwardly from the lower edge of actuator 242 is a contact member 268 having a generally V-shaped pivot surface 270 adapted to engage the separate, pivot lever or member as described below. The front of contact member 268 also includes a downwardly extending lip 272 which aids installation of the actuator assembly within the case as explained below. An elongated contact surface 274 is formed adjacent contact member 268 on the rear surface of actuator toggle 242 and extends at a slightly angled direction for proper contact with surface 198 when the toggle member is in its night position as is seen from FIG. 18.

Figure 27:
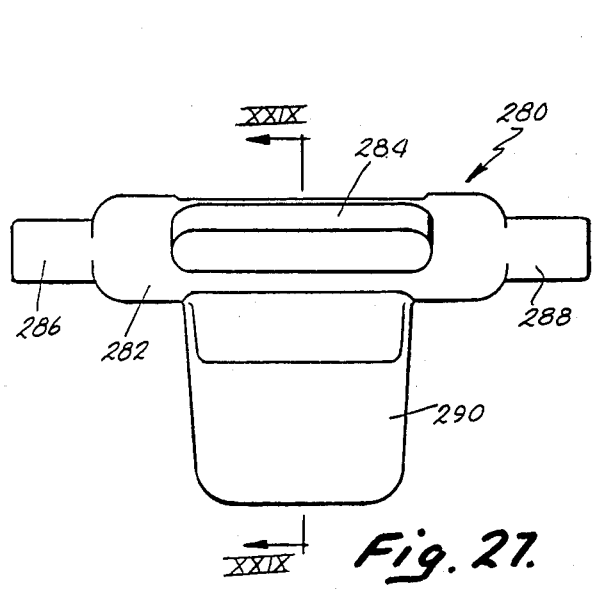
FIG. 27 is a front elevation of the actuator pivot lever of the mirror assembly of FIG. 17.
Figure 28:
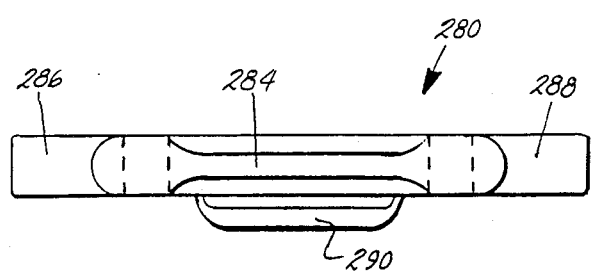
FIG. 28 is a top plan view of the pivot lever of FIG. 27.
Figure 29:
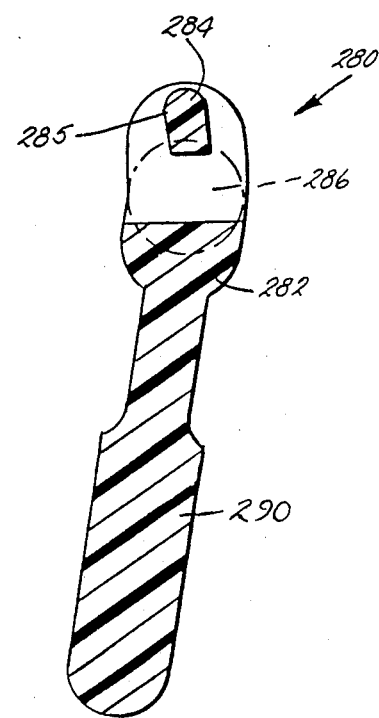
FIG. 29 is a sectional side elevation of the pivot lever of FIGS. 27 and 28 taken along plane XXIX—XXIX of FIG. 27.

Referring to FIGS. 27-29, the separate, lower pivot lever or member 280 is also preferably molded from acetal resin or the like and includes a pivot body 282 above which is suspended an integrally molded, flexible, resilient spring bar 284. Cylindrical pivot shafts 286, 288 extend oppositely from either end of pivot body 282 and are aligned and parallel with one another. A tab lever 290 extends downwardly from the lower side of pivot body 282. The side surfaces of spring bar 284 may be tapered downwardly and inwardly as at 285 to reduce interference and prevent binding when the pivot member is in its day position as shown in FIG. 18.

As will now be understood from FIGS. 17 and 18, following molding of case 162 and prior to snap-in insertion of the mirror element 166 within the peripheral sidewall of the case, actuator assembly 240 is assembled within the hollow interior space of the case. First, lower pivot member or lever 280 is loosely fitted with its tab lever 290 extending through aperture 177 and pivot shafts 286, 288 placed over shaft receiving spaces 196. Thereafter, actuator toggle member 242 is inserted within the case with ball member 246 and any support arm and rear surface 252 extending into and through aperture 176. Pivot shafts 258, 260 are loosely inserted between inclined surfaces 192, 194 of shaft receiving space 190 while surface 270 of contact member 268 engages spring bar 284. The combination of actuator toggle 242 and pivot lever 280 is then pushed downwardly and outwardly toward shaft receiving spaces 190, 196 such that inclined deflecting surfaces 266 on stop shoulders 262 on the actuator toggle engage inclined surfaces 210 on stop members 200, 202. Further pressure forces the respective shaft members into their shaft receiving spaces while the ends of the shaft members engage ramp members 220 to force support walls 170 slightly outwardly due to the inclined surfaces 224. Further pressure snaps the shaft members past ramp members 220 such that surfaces 222 prevent withdrawal of the shaft members from either the upper or lower shaft supports. Since shaft supports 180, 182 are closed toward the mirror element the actuator toggle 242 cannot be forced into the back of the mirror element even upon impact applied through ball member 246 therefore reducing breakage and injury due to fractured mirror elements. As the lower portion of toggle 242 is pushed against pivot lever 280, and shafts 286, 288 are pressed into shaft receiving spaces 196. Continued pressure causes lip 272 to engage the spring bar and prevent further downward pivoting of actuator toggle 242. Lip 272 also assists in forcing pivot member 280 toward the shaft receiving spaces 196 in support members 184, 186, and, together with ramps 220, helps resist withdrawal of pivot lever 280 from spaces 196 upon impact. Once the stop shoulders have passed the inclined surfaces 210 on stop members 200, 202, the stop members snap back into place with stop surfaces 208 overhanging stop surfaces 264 and limiting outwardly pivotal movement of the actuator toggle toward the mirror element 166. The ends of shafts 258, 260 and 286, 288 contact the inner surfaces of support walls 170 to prevent lateral shifting of the actuator and pivot lever/member within the case when the actuator assembly is received in support members 180, 182 and 184, 186.

As with embodiment 10, embodiment 160 may be moved between day and night positions by pivoting tab lever 290 forwardly or rearwardly past the overcenter position because the combined length of toggle 242 and pivot member 280 is greater than the spacing between supports 180, 182 and 184, 186 in the centered position. In the day position (shown in solid in FIG. 18), actuator toggle 242 is pivoted forwardly within the case interior such that stop surfaces 264 contact surfaces 208 on the stop members and the rear reflective surface of prism 166 is aligned with the driver's eyes for full reflective viewing. However, when tab lever 290 is pivoted forwardly to its night position (shown in phantom in FIG. 18) actuator toggle 242 is pivoted rearwardly such that surfaces 198 and 274 contact one another to limit rearward pivotal movement of the toggle and to define the night position when the front surface of mirror 166 is aligned with the driver's eyes for reduced reflective viewing. Accordingly, movement between the day and night positions is precisely controlled by surfaces 198 and 208 which are fully defined by the manufacture of the mirror case and are not dependent upon the assembly of other elements therewithin. As with embodiment 10, the distance between surfaces 198 and 208 may be varied to determine the distance of travel of the tab lever 290 from the day to the center position and from the night to the center position and may be set at 60/40, 50/50 or other ratios as desired as explained above.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. A day/night rearview mirror assembly for vehicles comprising:
    a mirror case having a back with an interior surface and a peripheral sidewall defining an interior space within said case;
    a prismatic mirror element having nonparallel, generally planar front and back surfaces supported and retained in said case, said mirror element being spaced from said case back; and
    actuator means mounted in said case within said interior space for shifting said case and mirror element between a predetermined reflectivity day position and a reduced reflectivity night position, said actuator means including lateral side edges and shaft means for supporting said actuator means in said case;
    support means for receiving said shaft means to pivotally support said actuator means;
    a pair of spaced rib means on said interior surface of said case back for reinforcing said mirror case;
    a pair of upstanding stop means on said interior surface of said case back, each of said stop means being positioned between one of said lateral side edges of said actuator means and one of said rib means for limiting shifting movement of said actuator means toward said mirror element.

2. The mirror assembly of claim 1 wherein said stop means include a pair of stop members extending toward said mirror element from said case back, said stop members each including a laterally inwardly extending stop flange defining a stop surface overhanging a portion of said actuator means for limiting movement of said actuator means.

3. The mirror assembly of claim 2 wherein said support means include a pair of spaced supports on said interior surface of said case back; said rib means extending between and reinforcing said spaced supports; brace means extending between each of said stop members and one of said rib means for reinforcing said stop members.

4. The mirror assembly of claim 2 including a pair of spaced support walls extending along the interior of said case back between the top and bottom of said mirror case, each support wall being adjacent one of said rib means.

5. The mirror assembly of claim 4 wherein said support means include a pair of spaced support members adjacent both the top and bottom of said case; said support members adjacent said top of said mirror case including shaft receiving spaces and flanges extending over said shaft receiving spaces and defining openings to said spaces which extend toward said case bottom; said flanges preventing said shaft means from moving toward said mirror element.

6. The mirror assembly of claim 5 including ramp means on said walls adjacent said shaft receiving openings for resisting withdrawal of said shaft means from said shaft receiving spaces.

7. The mirror assembly of claim 4 including brace means extending between each of said rib means and adjacent wall for reinforcing said case.

8. The mirror assembly of claim 2 wherein said actuator means includes pivot means for overcenter-type pivot operation including a pivot member movable from said day position to a center position to said night position; said stop surface spaced from said case back a predetermined distance such that said pivot member must travel a greater distance to move from at least one of said day and night positions to said center position than from the other of said day and night positions to said center position.

9. The mirror assembly of claim 8 wherein said one position is said day position while said other position is said night position.

10. The mirror assembly of claim 9 wherein said greater distance said pivot member must travel is approximately 60% of the total pivot travel distance.

11. The mirror assembly of claim 2 wherein said stop members each include an inclined surface leading from the outer end of said stop member to the lateral end of said stop flange, said stop flange lateral end being spaced laterally inwardly from said stop member.

12. The mirror assembly of claim 1 wherein said actuator means includes pivot means for overcenter-type pivot operation including a pivot member movable from said day position to a center position to said night position; each of said stop means including a stop surface spaced from said case back a predetermined distance such that said pivot member must travel a greater distance to move from at least one of said day and night positions to said center position than from the other of said day and night positions to said center position.

13. The mirror assembly of claim 12 wherein said actuator means include front and back surfaces, said front surface being closest to said mirror element; said stop members each including an outer end surface which extends beyond said actuator means toward said mirror element, said stop surfaces on said stop members being positioned intermediate said front and back surfaces of said actuator means.

14. The mirror assembly of claim 13 including brace means extending laterally from said stop members to said case back for reinforcing and stabilizing said stop members.

15. The mirror assembly of claim 14 wherein said brace means extend only to a position below said tops of said stop members.

16. The mirror assembly of claim 1 wherein stop means include an actuator receiving space therebetween; said stop means each including an inclined cam surface sloping downwardly and inwardly toward said actuator receiving space; said actuator means including inclined surfaces cooperating with said cam surfaces for deflecting said stop means during installation of said actuator means in said case.

17. The mirror assembly of claim 1 wherein said support means are spaced apart a predetermined distance for receiving said shaft means of said actuator means therein; said stop means being positioned inwardly of said support means.

18. The mirror assembly of claim 17 wherein said support means include spaced support members adjacent both the top and bottom of said case; said stop means being positioned intermediate said support members at said top and bottom of said case.

19. The mirror assembly of claim 1 wherein said actuator means include front and back surfaces, said front surface being closest to said mirror element; said actuator means including a pair of stop shoulders for engaging said stop means, one stop shoulder on each of said lateral side edges; said stop shoulders being positioned intermediate said front and back surfaces of said actuator means.

20. The mirror assembly of claim 19 wherein said stop shoulders are inclined toward the back of said actuator means beginning at the end of said stop shoulder closest to the top of said mirror case; said stop means including stop surfaces adapted to matingly engage said stop shoulders; said stop surfaces being inclined at angles corresponding to said stop shoulders.

21. The mirror assembly of claim 19 wherein said actuator means further includes inclined surfaces adjacent said stop shoulders for engaging and deflecting said stop means during installation of said actuator means in said case.

22. The mirror assembly of claim 19 wherein said actuator means includes a toggle member and a separate pivot lever; said toggle member having shaft members extending to either side for pivotally mounting said toggle member on said support means within and adjacent the top of said mirror case and a pivot surface spaced from said shaft members; said pivot lever including shaft members extending to either side thereof for pivotally mounting said pivot lever on said support means within and adjacent the bottom of said mirror case; and a spring bar engaging said pivot surface on said toggle member; said toggle member and pivot lever being so positioned when said shaft members are received in said support means such that said spring bar is deflected when said pivot lever is moved to shift said assembly between said day and night positions.

23. The mirror assembly of claim 1 wherein said actuator means includes a toggle member and a separate pivot lever; said toggle member having shaft members extending to either side for pivotally mounting said toggle member on said support means within and adjacent the top of said mirror case and a pivot surface spaced from said shaft members; said pivot lever including shaft members extending to either side thereof for pivotally mounting said pivot lever on said support means within and adjacent the bottom of said mirror case and a spring bar engaging a pivot surface on said toggle member; said toggle member and pivot lever being so positioned when said shaft members are received in said support means such that said spring bar is deflected when said pivot lever is moved to shift said assembly between said day and night positions.

24. The mirror assembly of claim 23 wherein said pivot lever includes a body; said spring bar being integrally molded with said body and is supported a distance spaced from said body toward said toggle member.

25. The mirror assembly of claim 23 including a protruding surface on the back of said toggle member for contacting said mirror case and positioning said actuator means in said night position.

26. The mirror assembly of claim 23 wherein said toggle member includes a lip adjacent said pivot surface and extending toward said case bottom and over said spring bar between said spring bar and prismatic mirror element to help prevent movement of said pivot member toward said prismatic mirror element and to aid in assembling said mirror assembly.

27. A day/night rearview mirror assembly for vehicles comprising:
   a mirror case;
   a prismatic mirror element having nonparallel, generally planar front and back surfaces supported and retained therein; and
   actuator means mounted in said case for shifting said case and mirror element between a predetermined reflectivity day position and a reduced reflectivity night position, said actuator means including lateral side edges and spaced shaft means for supporting said actuator means in said case;
   upstanding stop means in said case for limiting shifting movement of said actuator means toward said mirror element, said stop means including at least one inclined cam surface for engaging said actuator means upon installation;
   said actuator means including at least one inclined deflecting surface for cooperating with said inclined cam surface to deflect said stop means to allow insertion of said actuator means during assembly of said mirror assembly.

28. The mirror assembly of claim 27 including a pair of said stop means, said stop means being spaced apart and extending from the interior of the back of said mirror case adjacent either lateral side edge of said actuator means, the area between said stop means providing an actuator receiving space, each of said stop means including one of said inclined cam surfaces, each cam surface being inclined downwardly and inwardly toward said actuator receiving space.

29. The mirror assembly of claim 27 wherein said mirror case includes a case back; said stop means including a pair of stop members extending toward said mirror element from said case back, said stop members each including a stop flange defining a stop surface overhanging a portion of said actuator means for limiting movement of said actuator means.

30. The mirror assembly of claim 29 wherein said stop members each include an inclined surface leading from the outer end of said stop member to the lateral end of said stop flange, said stop flange lateral end being spaced laterally inwardly from said stop member.

31. The mirror assembly of claim 30 wherein said actuator means include front and back surfaces, said front surface being closest to said mirror element; said stop members each including an outer end surface which extends beyond said actuator means toward said mirror element, said stop surfaces on said stop members being positioned intermediate said front and back surfaces of said actuator means.

32. The mirror assembly of claim 30 including brace means extending laterally from said stop members to said case back for reinforcing and stabilizing said stop members.

33. The mirror assembly of claim 32 wherein said brace means extend only to a position below said tops of said stop members.

34. The mirror assembly of claim 27 wherein said actuator means includes pivot means for overcenter-type pivot operation including a pivot member movable from said day position to a center position to said night position; each of said stop means including a stop surface spaced from said case back a predetermined distance such that said pivot member must travel a greater distance to move from at least one of said day and night positions to said center position than from the other of said day and night positions to said center position.

35. The mirror assembly of claim 34 wherein said one position is said day position while said other position is said night position.

36. The mirror assembly of claim 27 wherein said actuator means include front and back surfaces, said front surface being closest to said mirror element; said actuator means including a pair of stop shoulders for engaging said stop means, one stop shoulder on each of said lateral side edges; said stop shoulders being positioned intermediate said front and back surfaces of said actuator means; said stop shoulders being engaged by said stop means.

37. The mirror assembly of claim 36 wherein said actuator means includes one of said inclined deflection surfaces thereon adjacent each of said stop shoulders.

38. A day/night rearview mirror assembly for vehicles comprising:
   a mirror case having a case back and a peripheral sidewall defining a front opening;
   a prismatic mirror element having nonparallel, generally planar front and back surfaces supported and retained on said peripheral sidewall and closing said front opening; and
   actuator means mounted on said case for shifting said case and mirror element between a predetermined reflectivity day position and a reduced reflectivity night position, said actuator means including lateral side edges, spaced shaft means for supporting said actuator means in said case, and a pivot member for moving said assembly from said day position to a center position, and to said night position;
   support means for receiving said spaced shaft means to pivotally support said actuator means therebetween, said support means including a pair of spaced support members adjacent both the top and bottom of said case; said support members adjacent said top of said mirror case including shaft receiving spaces and flanges extending over said shaft receiving spaces and defining openings to said spaces which extend toward said case bottom; said flanges being generally parallel to said prismatic mirror element and preventing said shaft means from moving toward said mirror element;
   a pair of spaced walls extending from top to bottom within said case, one of said walls adjacent each of said support means adjacent said top of said case; and ramp means on said walls adjacent said shaft receiving openings for resisting withdrawal of said shaft means from said shaft receiving spaces.

39. The mirror assembly of claim 38 wherein said walls are spaced sufficiently to engage the ends of said shaft means and prevent lateral movement of said actuator means in said case.

40. The mirror assembly of claim 38 wherein said shaft means extend in a first direction generally parallel to said prismatic mirror element; said ramp means include a shoulder extending inwardly toward said actuator means from each of said walls in a second direction generally transverse to said first direction.

41. The mirror assembly of claim 40 wherein said each of said shoulders includes an inclined surface leading toward one of said shaft receiving openings whereby said shaft means can deflect said shoulders and walls temporarily outwardly during installation.

42. The mirror assembly of claim 38 including a pair of spaced rib means on said case back for reinforcing said mirror case; each of said rib means extending adjacent one of said walls and connecting said support members adjacent the top and bottom of said mirror case on one side of said actuator means.

43. The mirror assembly of claim 38 wherein said actuator means includes a toggle member and a separate pivot member; said toggle member having shaft members extending to either side for pivotally mounting said toggle member on said support means within and adjacent the top of said mirror case and a pivot surface spaced from said shaft members; said pivot member including shaft members extending to either side thereof for pivotally mounting said pivot member on said support means within and adjacent the bottom of said mirror case; and a spring bar engaging said pivot surface on said toggle member; said toggle member and pivot member being so positioned when said shaft members are received in said support means such that said spring bar is deflected when said pivot member is moved to shift said assembly between said day and night positions.

44. The mirror assembly of claim 43 wherein said toggle member includes a lip adjacent said pivot surface and extending toward said case bottom and over said spring bar between said spring bar and prismatic mirror element to help prevent movement of said pivot member toward said prismatic mirror element and to aid in assembling said mirror assembly.

45. The mirror assembly of claim 44 wherein said mirror case includes at least one stop member having a stop surface for engaging said actuator means for limiting movement of said actuator means; said stop surface helping to prevent movement of said pivot member toward said prismatic mirror element in combination with said lip.

46. The mirror assembly of claim 45 wherein said stop surface is spaced from said case back a predetermined distance such that said pivot member must travel a greater distance to move from at least one of said day and night positions to said center position than from the other of said day and night positions to said center position.

47. The mirror assembly of claim 38 wherein said mirror case includes at least one stop member having a stop surface for engaging said actuator means for limiting movement of said actuator means.

48. The mirror assembly of claim 47 wherein said stop member includes an outwardly extending stop flange defining said stop surface and an inclined surface leading from the outer end of said stop member to the lateral end of said stop flange, said stop flange lateral end being spaced laterally inwardly from said stop member.

49. A day/night rearview mirror assembly for vehicles comprising:
   a mirror case having a back and a peripheral sidewall defining an interior space within said case;
   a prismatic mirror element having nonparallel, generally planar front and back surfaces supported and retained on said peripheral sidewall, said mirror element being spaced from said case back; and
   actuator means mounted in said case within said interior space for shifting said case and mirror element between a predetermined reflectivity day position and a reduced reflectivity night position, said actuator means including lateral side edges and shaft means for supporting said actuator means in said case;
   support means for receiving said shaft means to pivotally support said actuator means;
   said actuator means includes a toggle member and a separate pivot lever; said toggle member having shaft members extending to either side for pivotally mounting said toggle member on said support means within and adjacent the top of said mirror case and a pivot surface spaced from said shaft members of said toggle member; and pivot, lever including shaft members extending to either side thereof for pivotally mounting said pivot lever on said support means within and adjacent the bottom of said mirror case; and a spring bar engaging said pivot surface on said toggle member; said toggle member and pivot lever being so positioned when said shaft members are received in said support means such that said spring bar is deflected when said pivot lever is moved to shift said assembly between said day and night positions;
   said toggle member also including a lip adjacent said pivot surface and extending toward said case bottom and over said spring bar between said spring bar and prismatic mirror element to help prevent movement of said pivot lever toward said prismatic mirror element and to aid in assembling said mirror assembly.

50. The mirror assembly of claim 49 wherein said mirror case includes at least one stop member having a stop surface for engaging said actuator means for limiting movement of said actuator means; said stop surface helping to prevent movement of said pivot lever toward said prismatic mirror element in combination with said lip.

51. An improved toggle member for day/night rearview mirror assemblies including a toggle body, support means for movably supporting said toggle body in a mirror case, and mounting means for receiving a ball member forming a ball joint with said toggle body, said mounting means including a clamping member engaging said ball joint and retaining means for holding said clamping member against said ball joint to maintain a predetermined frictional resistance to movement of said ball joint, the improvement comprising:
   flange means formed integrally and in one piece with said toggle body at a position spaced from said retaining means across said ball joint, said flange means including receiving means for receiving and holding a portion of said clamping member whereby said clamping member may be tightened and loosened against said ball joint with said retaining means; said flange means including a reinforcement ridge on said toggle body;

said support means including parallel, aligned shaft members for pivotally supporting said toggle body in a mirror case, one shaft member extending from each side of said toggle body; said ridge extending across said toggle body generally parallel and in alignment with said shaft members.

* * * * *

UNITED STATES PATENT AND TRADEMARK OFFICE
CERTIFICATE OF CORRECTION

PATENT NO. : 4,826,289

DATED : May 2, 1989

INVENTOR(S) : Wayne Vandenbrink and Howard W. Fant, Jr.

It is certified that error appears in the above-identified patent and that said Letters Patent is hereby corrected as shown below:

Column 2, line 31:

"or" should be --of--.

Column 12, line 32:

"17" should be --176--.

Column 20, claim 49, line 27:

"and pivot," should be --said pivot--.

Column 20, claim 49, line 31:

";" should be --,--.

Signed and Sealed this

Twelfth Day of June, 1990

Attest:

HARRY F. MANBECK, JR.

Attesting Officer

Commissioner of Patents and Trademarks